United States Patent Office 3,427,797
Patented Feb. 18, 1969

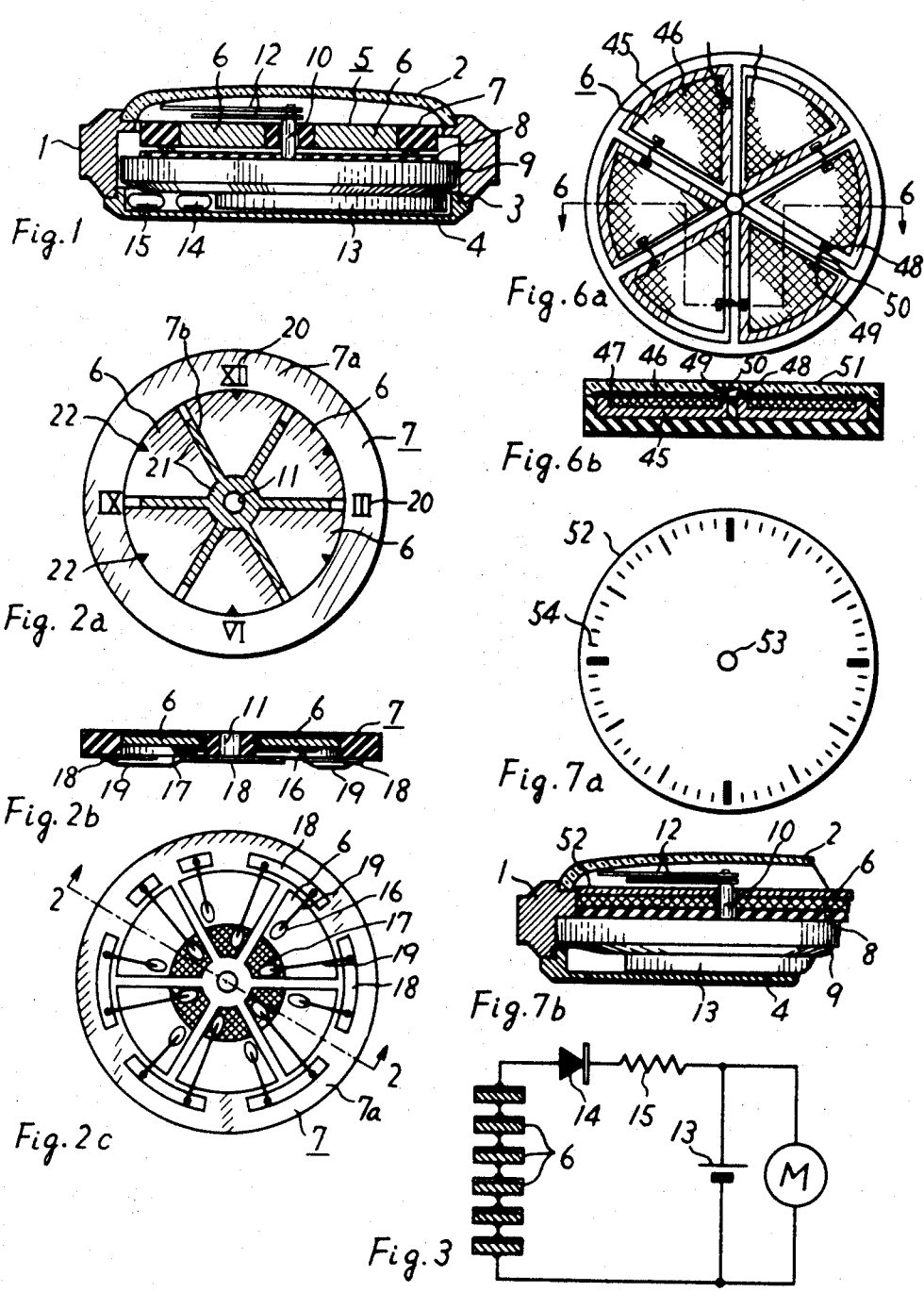

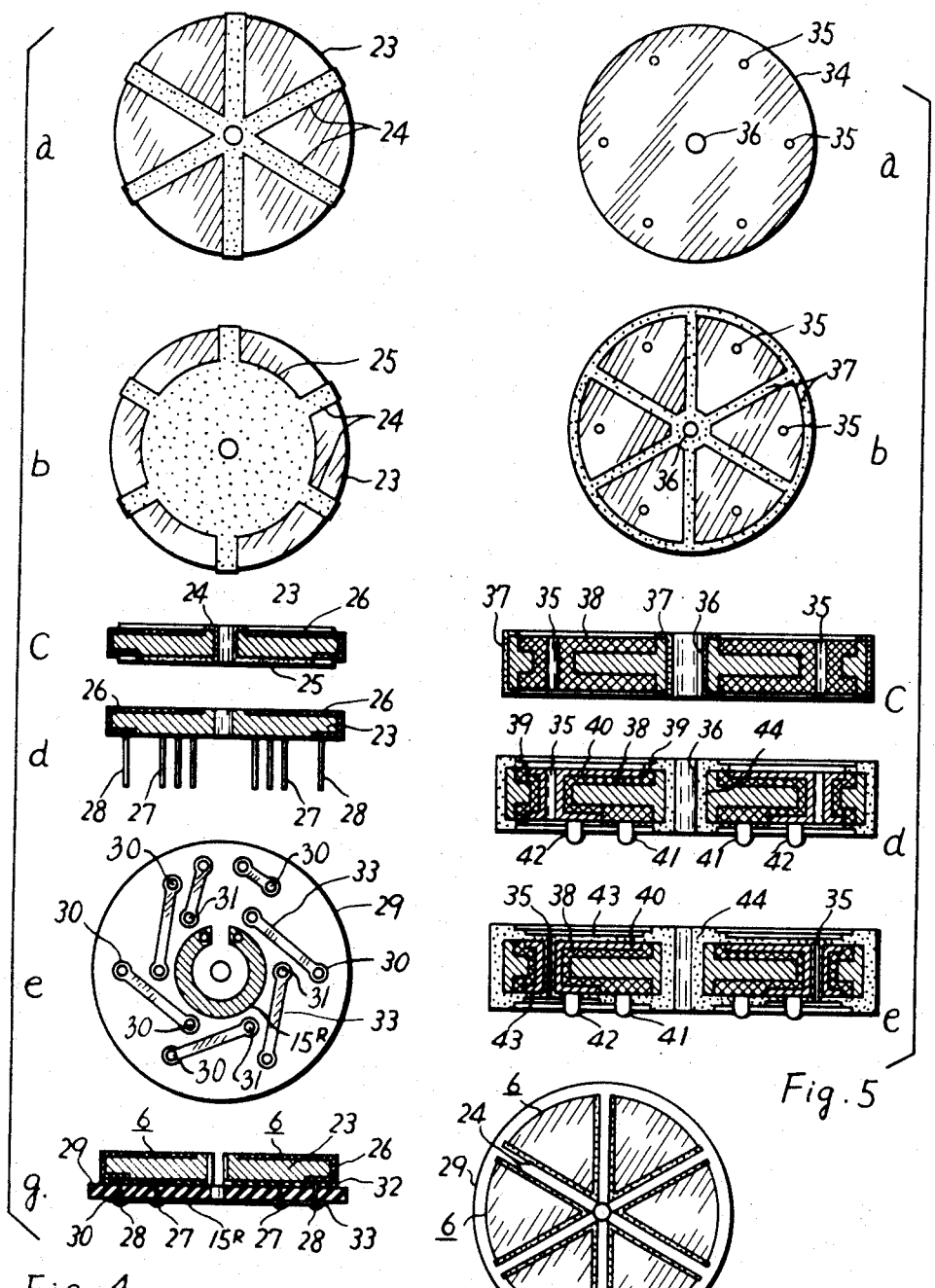

3,427,797
TIMEPIECE USING A SOLAR BATTERY AS THE POWER SOURCE
Kenjiro Kimura, 2303 Kurozuchi-cho, Sakai-shi, Osaka-fu, Japan; Akio Negoro, 3 Kumano-cho, Higashi 5-chome, Sakai-shi, Osaka-fu, Japan; Yasuo Kojima, 50 Tezakayama Nishi 1-chome, Abeno-ku, Osaka, Japan; and Tsutomu Saiji, 239 Shindo-cho, Matsubara-shi, Osaka-fu, Japan
Continuation-in-part of application Ser. No. 412,701, Nov. 20, 1964. This application Dec. 12, 1966, Ser. No. 607,121
U.S. Cl. 58—23   7 Claims
Int. Cl. G04c 3/00

ABSTRACT OF THE DISCLOSURE

This invention concerns an improved timepiece utilizing solar cells as the energy source which enables the construction of a compact, attractive and dependable device wherein an opening extends through each said solar cell and said opening having on its wall a diffusion layer to connect layers on each side of said solar cell.

---

This is a continuation-in-part application of application Ser. No. 412,701, filed Nov. 20, 1964, entitled Time-Piece Using a Solar Battery as the Power Source.

This invention related to semiconductor elements which may be utilized as solar cells and to timepieces employing such elements as solar cells for the operation thereof.

In forming semiconductor wafer elements having diffusion layers on the front and rear surfaces it has heretofore been necessary to connect such layers by carrying such layers about the edge of the wafer. That procedure is disadvantageous in that the layers on the edge of the wafer are easily damaged even in normal handling procedures. This invention overcomes the above difficulty by providing at least one hole in the wafer and forming the diffusion layers on the wall of the opening to connect the layers on the opposite sides thereof.

The use of solar semiconductor cells as the power source for timepieces such as watches and clocks has also been suggested, but known cells have been difficult to embody in the timepieces and restricted design considerations. This invention, on the other hand, provides a novel and improved timepiece wherein the dial is combined with the solar battery which thereby minimizes design restrictions and integrates the solar battery with the timepiece. The voltage of a solar battery, however, may be as low as .2 volt under a normal light intensity of about 200 lux, which is not sufficient to drive a clock mechanism. This difficulty is readily overcome with the invention by forming the dial of a plurality of small solar batteries which by reason of their improved structure facilitates their connection one to the others to obtain a higher voltage while still providing an attractive design.

A preferred embodiment of the invention for use in timepieces involves a solar battery formed of a number of cells, preferably twelve, six or four, which are sectoral in configuration and arranged about a center to form a dial. These cells may be supported by a base plate having printed connections formed thereon for serially connecting the cells one to the other. With this arrangement, the borderlines of the individual cells may be used as time-indicating marks, and, in the event certain of the borderlines or portions thereof are unnecessary, they may be readily painted with a suitable coating material having the same color as the surface of the cells.

Another embodiment of the invention involves the utilization of a plurality of cells formed on a single piece of silicon. The silicon is in the form of a relatively flat plate having the desired size and configuration. A mask of a material such as silicon oxide is adhered to portions of the plate which are to form the borders between adjoining elements. The unmasked portions of the plate are then treated to form p-n junctions. This method of treating semiconductor bodies is generally known as the selective diffusion method. The mask may be removed or may remain in place, and the treated disk is then fixed to a suitable insulating plate. The silicon plate may then be cut into segments without damaging the p-n junctions, and the electrical characteristics of each of the elements will be uniform and the surfaces of the elements will present a uniform and attractive appearance.

In another embodiment of the invention, the plurality of solar elements are made of a single silicon plate, and it is not necessary to mechanically cut the plate. For this purpose, either an n or p type intrinsic silicon plate may be used, that is, a silicon plate having very low impurities. A selective diffusion method is used to provide a first diffusion layer having a different conductivity type from that of the silicon plate. A similar selective diffusion process is used to provide a second diffusion layer overlying the first diffusion layer and having a conductivity type different from that of the first layer. Thus, each element or cell consists of first and second diffusion layers, and the nondiffused portions of the silicon plate are utilized as the spacers between the cells. Inasmuch as the concentration of impurities in the nondiffused portions of the silicon is low, adequate insulation is provided between the adjoining cells and the cells can be connected in series. With this arrangement, it is not necessary to cut the silicon plate and therefore when used in a timepiece an attractive dial is provided.

Another object of the invention resides in the provision of a novel and improved construction and arrangement of elements for serially connecting the plurality of cells to form a solar battery. This may be accomplished by extending the diffusion layer of the front surface of each cell to the rear side by means of holes extending through each of the cells and having the diffusion layers formed on the walls of the holes. In this way, difficulties encountered in carrying the diffusion layers over the peripheral edge of the silicon plate are avoided since such exposed layers may be damaged readily in handling. When used in a timepiece and by properly positioning the holes in each of the cells, the holes may be utilized as indicia for indicating time and the electrical connections may be arranged readily on the rear side of the plate.

The serial connection of the elements may be accomplished either on the rear side of the elements or on the front surface depending on the nature of the elements. When making the connections on the front surface of the elements, fine electrodes are affixed to the elements in nonrectifying positions so that the electrodes of adjoining elements or cells can be connected with very fine wires which have minimal effect on the appearance of the finished dial plate and do not shield the incident light. The electrodes may be formed by evaporation of aluminum to form layers having areas of about 20 by 100 microns and the electrodes can be connected by wires having diameters of the order of ten to twenty microns. The lead wires may be attached to the electrodes by a suitable thermo-compression bonding method. Insulation of the lead wire from the surface of the element may be accomplished by providing insulating layers on the elements or cells formed by oxidizing the silicon which constitutes the basic material of the element. The lead wires and the electrodes may be protected by a film of a suitable transparent resinous material.

A still further object of the invention resides in the provision of a novel and improved circuit for driving the clock or watch mechanism with a solar battery. It was pointed out above that the voltage produced by a single solar battery or cell was insufficient to drive the electric motor, and furthermore, it is apparent that the voltage generated will vary in accordance with the amount of incident light. With this invention, the voltage of a series of solar elements is provided, and this voltage is utilized to charge a rechargeable battery, such as a storage battery or the like, which thereby maintains a constant supply of power for driving the electric motor for operating the clock or watch. With the utilization of six solar cells or elements, a rechargeable battery of 1.25 volts can be charged under normal light intensity of about 200 lux. In addition, the solar elements are connected to the battery through a diode and current-limiting resistor. The diode functions to prevent discharge of the storage battery when the voltage of the solar cell is relatively small. The resistor limits the current in the event the solar battery is directly subjected to bright sunlight thereby protecting both the solar cells as well as the storage battery. In a preferred embodiment of the invention, the driving mechanism is placed immediately behind the solar cells forming the dial of the timepiece, and a button-type rechargeable storage battery is placed behind the driving mechanism. The diode and resistor are relatively small and may be placed in any available position within the housing of the timepiece. If desired, the resistor may be in the form of thin film carried by an insulating base supporting solar cell dial.

Still another object of the invention resides in the provision of a novel and improved solar cell dial wherein the reflection of light from the surface of the dial is minimized. This is attained in one embodiment of the invention by the utilization of a transparent plate overlying the surface of the solar cells. By making said overlying plate of a colored transparent or translucent material or a material having an abraded or etched surface, reflection is minimized and conventional indicia can be used for indicating time. In the alternative, a reflection-preventing coating can be applied to the surface of the solar cells. When using such anti-reflection coating, the time-indicating indicia can be in the form of a somewhat heavier coating which will make them clearly visible without interfering with the transmission of light to the solar elements.

The above and other objects and advantages of the invention will become more apparent from the following description and accompanying drawings forming part of this application.

In the drawings:

FIGURE 1 is a cross-sectional view of a watch in accordance with the invention.

FIGURE 2a is a plan view of a solar battery dial plate in accordance with the invention.

FIGURE 2b is a cross-sectional view of the dial plate shown in FIGURE 2c and taken along the line 2b—2b thereof.

FIGURE 2c is a plan view of the reverse side of the dial plate shown in FIGURE 2a.

FIGURE 3 is a circuit diagram of a preferred embodiment of the invention.

FIGURES 4a through 4g show steps in the manufacture of one form of solar battery dial in accordance with the invention and in which FIGURES 4a and 4b are front and rear views respectively of a silicon plate having oxide masks applied thereto; FIGURES 4c and 4d are cross-sectional views showing the steps in the formation of the light sensitive junctions; FIGURE 4e is a rear view of an insulating base plate; FIGURE 4f is a front view of the completed dial ready for attachment to the insulating base plate; and FIGURE 4g is a cross-sectional view of the solar battery dial affixed to the insulating base plate.

FIGURES 5a through 5e illustrate the manufacturing process of another embodiment of the invention and in which FIGURES 5a and 5b are front and rear views of a masked silicon plate and FIGURES 5c, 5d and 5e are cross-sectional views illustrating the steps in the formation of the diffusion layers.

FIGURE 6a is a plan view of still another embodiment of the invention.

FIGURE 6b is a cross-sectional view of FIGURE 6a taken along the line 6b—6b thereof.

FIGURE 7a is a plan view of a transparent plate for placement in overlying relationship with a solar battery dial in accordance with the invention and carrying time-indicating indicia thereon.

FIGURE 7b is a cross-sectional view of a watch embodying the overlying dial plate as illustrated in FIGURE 7a.

Referring now to the embodiment of the invention shown in FIGURES 1 and 2a through 2c, there is illustrated a watch in accordance with the invention which includes an annular housing 1, a front glass or crystal 2 which is supported by the front side of the housing 1 and a rear cover 4 threadably engaging the rear side of the housing by screw threads 3. Immediately underlying the crystal 2 is a dial plate 5 comprising a plurality of silicon solar battery elements or cells 6 and an insulating base plate 7 which supports said elements. To the rear of the solar battery dial 5, there is an electrically driven mechanism 9 which is spaced from the dial plate by an insulating plate 8. An indicator shaft 10 extends upwardly from the mechanism 9 and through a central hole 11 in the dial plate 5. This indicator shaft carries the watch hands 12 in the usual manner. A button-type rechargeable storage battery 13, a diode 14 and a charging resistor 15 are disposed between the rear watch cover 4 and the motor 9.

The solar battery dial plate 5 is shown in detail in FIGURES 2a through 2c. It will be observed that the dial plate 5 comprises a wheel-like structure 7 of insulating material having an annular or rim portion 7a and inwardly extending spokes 7b terminating in a central hub. The elements 6 are in the shape of sectors which are carried between the spokes 7b, and each of the sectors carries output terminals 16 and 17 on the rear face thereof. The rear face of the wheel rim portion 7a is provided with arcuate copper foils 18 printed thereon. These foils are connected to the terminals 16 and 17 by lead wires 19 so that the elements are serially connected. It will be observed in FIGURE 2a that some of the indicia for indicating time are carried by the rim portion 7a and the spoke portions 7b are arranged in positions corresponding to the time-indicating numerals 1, 3, 5, 7, 9 and 11. Inner portions of the spokes 7b may be coated with a material of the same color as the surface of the elements 6 leaving only the outer ends of the spokes to serve as the time indicating indicia. This coating is preferably in the form of a reflection-preventing layer of the type used to coat camera lenses. Heavier reflection coatings may be utilized to provide the indicating marks 22 which would correspond to the positions of the numerals 2, 4, 6, 8, 10 and 12.

A preferred circuit diagram for the timepiece described above is shown in FIGURE 3. The six silicon solar cells or elements 6 are connected in series. One end of the uppermost cell is connected to the battery 13 through the diode 14 and the current-limiting resistor 15. The bottom cell is connected directly to the other side of the battery 13. The motor 9 is connected directly to the battery 13. The electromotor force or voltage of the six cells when irradiated with a light intensity of the order of 200 lux charges the storage battery 13 with a voltage of approximately 1.25 volts which is of a magnitude sufficient to drive the motor 9. When the solar cells receive sunlight directly, the voltage increases substantially but the charging resistor 15 limits the maximum current flow through the solar cells and avoids the application of excessive voltage to the battery 13. When the voltage of the solar cells becomes very low as a result of its use in areas of very low light intensity, the solar cell voltage falls below the terminal voltage of the battery 13, and the reversal of current in the circuit is then prevented by the diode 14.

A modified embodiment of the invention is shown in FIGURES 4a through 4g. In this form of the invention, a plurality of solar cells are formed from a single piece of silicon by a mask diffusion method. More specifically, an n type silicon disk 23 is formed which is to serve, in effect, as the dial plate of a timepiece. As shown in FIGURES 4a and 4b, masks 24 and 25 are formed on the front and rear surfaces respectively by oxidizing the portions which are to become the borders between the solar cells or elements. In FIGURE 4a, the spokes 24, identified by the stippling, illustrate the portions being masked, while the intervening sectors will ultimately constitute the solar cells. As will be observed in FIGURE 4b, the strips or spokes 24 extend about the edge of the silicon disk 23 and intersect a circular mask 25 on the backside. The central opening in the silicon disk 23 is also masked by the application of an oxidized layer as will be observed more clearly in FIGURE 4c. The silicon plate 23 is then heated in an atmosphere containing a p type impurity so that the impurity is diffused into the unmasked portions of the disk. The diffusion layer is denoted by the numeral 26 as will be observed in FIGURES 4c and 4d. This technique is known as the selective diffusion or mask diffusion method in the manufacture of transistors and therefore a detailed explanation is not deemed necessary. After diffusion the masks are completely removed as will be observed in FIGURE 4d, or, in the alternative, only a portion of the mask is removed for the purpose of making ohmic connections by the attachment of leads 27. The disk 23 may of course be of p type silicon, in which case an n type impurity would then be used in the formation of the diffusion layer 26.

The leads 27 and 28 are attached to the rear faces of the solar cells or elements 6 to form connections as shown in FIGURE 4d. The leads 27 are connected with the nondiffused portions of each cell, while the leads 28 are connected to the diffused portions 26. The leads are then fed through a plurality of small holes 30 and 31 in an insulating base plate 29 as shown in FIGURE 4e, and the disk 23 is bonded to the plate 29 by a suitable bonding agent 32. As will be observed in FIGURE 4e, copper foils or strips 33 are printed on the rear faces of the base plate 29 and the leads 27 and 28 are soldered to these copper strips to connect the elements in series. The disk 23 is then cut along the diametral masked portions 24 on the front face of the plate 29 as shown in FIGURE 4f. It is important in cutting the plate that the width of the cuts be less than the width of the masked portions 24 so that the diffused areas are not affected. With this procedure, solar cells 6 are mechanically separated and individually supported by the base plate 29. The rear of the base plate 29 also includes a resistive film 15r which constitutes the charging resistor 15 referred to in connection with FIGURE 3.

Still another embodiment of the invention is shown in FIGURES 5a through 5e in which a plurality of solar cells are made simultaneously by a mask diffusion method somewhat similar to that illustrated in FIGURES 4a through 4g, but which does not require cutting of the silicon disk in order to provide the separate solar cells.

More specifically, the silicon disk 34 is intended to serve as the dial plate of the timepiece of which it will form a part. It is formed of silicon having a relatively small impurity concentration so that it is relatively intrinsic and is of n-type conductivity. Small holes 35 are formed in an annular array about the central opening 36 and spaced from the edge of the disk 34. The holes 35 and 36 may be formed in any desired manner, as for instance, by a supersonic cutting process. While the holes 35 may be placed in any position, it is desirable to place them in uniformly spaced angular positions corresponding to the numerals on a watch or clock, so that they may serve as time-indicating indicia in the final structure. As illustrated in FIGURE 5b, the mask 37 is applied by oxidation to the periphery of the disk and along diametral lines forming in effect spokes of a wheel. The center portions surrounding the holes 36 are also masked as well as the walls of the holes 36. The masked disk is then heated in an atmosphere containing a p-type impurity which diffuses into the disk and forms a first diffusion layer 38 covering the areas of the disk which were not masked. This will be observed in FIGURE 5c. A second mask 39 is applied to the disk as illustrated in FIGURE 5d so that the peripheral portions of the first diffusion layer 38 are coated. The disk is then subjected to an atmosphere containing an n-type impurity to form a second diffusion layer 40. Each of the solar battery elements or cells then constitutes a first diffusion layer 38 and a second diffusion layer 40. Ohmic contacts 41 and 42 for serially connecting the elements are provided on the first diffusion layer portions 38 and the second diffusion layer portions 40. An oxide layer 43 as shown in FIGURE 5e is then formed over the entire surface in order to protect the solar cells from humidity.

In the foregoing embodiment of the invention, it will be observed that each of the elements consists of layers 38 and 40 and are mutually separated by the nondiffused portions 44. As the impurity concentration of the nondiffused portions 44 is relatively small, that is, such portions are substantially the same as the intrinsic material, insulation is maintained between the individual solar cells. Furthermore, since the walls of the openings 35 were not masked, the first and second diffusion layers 38 and 40 on the front and rear surfaces of each cell are connected one to the other. For this reason, the photoelectromotive energy generated on the surface of the disk 34 is fed to the ohmic contacts 41 and 42 on the rear side of the disk 34. In addition and as pointed out above, the holes 35 may be utilized as the time-indicating indicia on the resultant timepiece.

It is evident from the foregoing description that the disk 34 could be made of a material having a small p-type impurity concentration, in which case the first diffusion layer 38 would be of n-type conductivity while the second diffusion layer 40 would be of p-type conductivity. The provision of semiconductor elements or cells having holes extending therethrough for connection of the diffusion layer or layers on the opposing sides thereof is useful in a variety of applications other than in combination with timepieces.

Still another embodiment of the invention is shown in FIGURE 6, in which form of the invention the several solar cells 6 are serially connected on the front or light receiving face. In this form of the invention, the sectorally shaped solar cells 6 each comprise a p-type base 45 with an n-type diffusion layer 46 covering a portion of the area of each of the solar cells and leaving a peripheral portion of each cell which does not include the diffused layer. The cells 6 are arranged in an annular configuration on a base plate of insulating material. If desired, the base 45 of each solar element may be of an n-type material and the diffused layer 46 may be of a p-type material. These solar cells can be made by the mask diffusion method as described above in connection with FIGURE 4. In the event the cells are made by the utilization of two diffusion layers, the method described in connection with FIGURE 5 may be employed, in which case an insulating base is not required. The surfaces of the elements 6 as shown in FIGURE 6a are covered with a silicon oxide layer 47, and this layer affords electrical insulation and at the same time is permeable to light. Small areas of the oxide layer 47 of each cell are removed to expose the p-type base 45 on one side of the cell and the n-type diffused layer 46 on the other side of the cell. Minute electrodes 48 and 49 are then attached to the exposed areas. The size of each electrode may be about twenty by one hundred microns and leads 50 of gold wire having a diameter of ten to twenty microns connect the electrodes 48 and 49 by a thermo-compression bonding method. The leads 50 are insulated because they rest against the oxide layer 47. A transparent protecting film 51 of a suitable resinous material is then adhered in overlying relationship to the oxide layer 47 and the leads 50.

In the embodiment of the invention shown in FIGURES 7a and 7b, the solar battery cells 6 are combined with an overlying plate 52 which actually carries the time-indicating indicia 54. The plate 52 has a central opening 53 to receive the central shaft 10 from the motor 9 and is made of a light permeable material. The plate 52 can of course be made of a completely transparent material, a colored translucent material or a material in which the surface has been abraded or etched.

It is to be understood that in the several embodiments of the invention the central opening in the dial plate may be a viewing opening for observing time-indicating indicia in the usual manner. Furthermore, the printed circuit plate of FIGURE 4 may be used with other embodiments of the invention such as the embodiment of FIGURE 5 and the protective layers such as the layer 47 of FIGURE 6 or other transparent or translucent material may be used with equal effectiveness on the other embodiments of the invention.

What is claimed is:

1. A timepiece having photoelectric devices for the conversion of light energy to electric energy for operation of said timepiece comprising a dial composed of a plurality of photoelectric conversion elements having light sensitive front surface layers forming the face of the dial, means adjoining the rear surface of said dial interconnecting said elements one to the others to produce a single energy source, an opening extending through said dial, and electrically operated timing means connected to said elements.

2. A timepiece having photoelectric devices for the conversion of light energy to electric energy for operation of said timepiece comprising a dial composed of a plurality of photoelectric conversion elements having light sensitive front surface layers forming the face of the dial, means adjoining the rear surface of said dial interconnecting said elements one to the others to produce a single energy source, a time indicating opening extending through said dial, and electrically operated timing means connected to said elements, said photoelectric conversion elements each including a base material having an opening extending therethrough, a first layer of semiconductive material of one conductivity type on at least the front surface, the wall of said opening and at least part of the rear surface thereof, a relatively thin layer of semiconductor material of the other conductivity type overlying said first layer on the front surface, the wall of said opening and part of the first layer on said rear surface and leads electrically connected to said conductivity layers on the rear surfaces of said elements for connecting the elements one to the others and to the electrically operated timing means.

3. A timepiece according to claim 2 wherein said photoelectric elements are carried by an insulating plate having openings therein for receiving said leads, and conductors on said plate for connecting said elements one to the others.

4. A timepiece according to claim 2 wherein said dial comprises a silicon plate of said other conductivity type forming the base material of all said elements and each of said elements comprises a discrete part of said plate.

5. A timepiece according to claim 4 wherein said elements are spaced uniformly about said plate and said openings form time indicating indicia.

6. A timepiece according to claim 2 wherein each of said elements is coated with a protective layer of silicon oxide.

7. A timepiece according to claim 2 wherein at least the front surface of each element is coated with an anti-reflection material.

References Cited

FOREIGN PATENTS 1,056,646  3/1954  France.

RICHARD B. WILKINSON, *Primary Examiner.*

EDITH C. SIMMONS, *Assistant Examiner.*

U.S. Cl. X.R.

136—89